Oct. 8, 1968   E. A. DICUS   3,404,528
COUPLING LINK
Filed Oct. 18, 1966
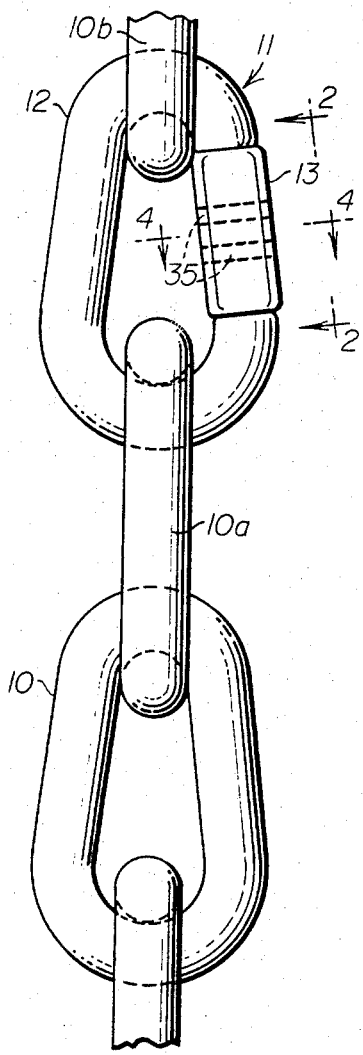
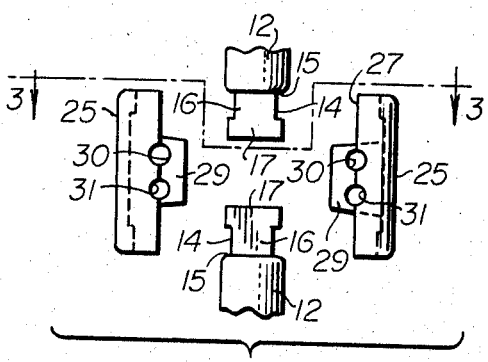
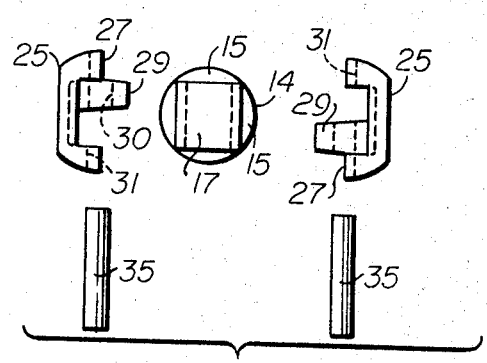
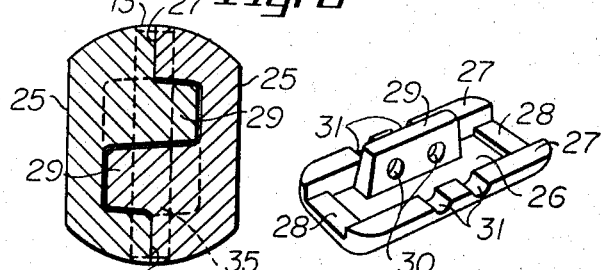
Fig. 1  Fig. 2  Fig. 3  Fig. 4  Fig. 5
INVENTOR.
EMROLD A. DICUS
BY Watts, Hoffmann,
Fisher & Heinke, Attys.

United States Patent Office 3,404,528
Patented Oct. 8, 1968

3,404,528
COUPLING LINK
Emrold A. Dicus, Fairview Park, Ohio, assignor to
The Upson-Walton Company
Filed Oct. 18, 1966, Ser. No. 587,469
8 Claims. (Cl. 59—85)

This invention relates generally to coupling links, and more specifically to a new coupling link structure of a type which may be used for connecting the links of chains to each other or to a ring to form a sling and for a wide variety of other purposes.

The present invention provides a new coupling link of the type generally described above having the features of high strength and a compact, relatively simple construction which can be easily and quickly assembled. At the same time, the invention provides a coupling link structure which can be inexpensively manufactured, preferably by forging. Another feature of the invention resides in a new coupling link structure which can be disassembled in the field and re-used.

The new coupling link structure is generally comprised of a link having at least two spaced end portions and a split coupler which extends between and connects the spaced end portions together. The link may be in the form of a unitary, generally C-shaped member having T-shaped end portions which extend toward each other and are locked within the split coupler. Alternatively, it is contemplated that the link may be formed in segments to provide a plurality of spaced end portions, each pair of which are connected by a split coupler to form an endless structure.

The novelty of the invention particularly resides in the construction of the split coupler and its cooperation with the end portions of the link. In the preferred embodiment of the invention, the split coupler is formed by identical half sections which mate together to enclose the ends of the link. Each half section includes an inner rib extending longitudinally of the section, and the ribs of both sections are disposed side-by-side between the enclosed ends of the link and are secured together by pins or the like extending transversely of the axis of the coupler.

In use the split coupler is quickly assembled about the ends of the link and the sections easily secured in place by inserting pins through the ribs. The sections of the split coupler and the ends of the link are cooperatively formed to prevent relative movement and to provide high strength under tension loads. In the event that it is desired to disassemble the link structure, the pins can be driven from the split coupler and the entire assembly can be subsequently assembled for re-use. As will be apparent from the following detailed description, the assembly and disassembly of the link structure requires few tools and can be easily accomplished.

The construction of the split coupler is such that the two sections can be made in a simple forging operation. The two sections of the split coupler, as well as the link, are preferably made of an alloy steel, such as an 8740 alloy steel or the like. Further, the identical construction of the two sections of the split coupler is such that it can be made with relatively inexpensive tooling and only a single set of forging dies is required.

Other advantages and a fuller understanding of the invention will be had from the following detailed description taken in conjunction with the accompanying drawings.

In the drawings:

FIGURE 1 is a fragmentary, elevational view of a chain embodying the new coupling link structure of this invention;

FIGURE 2 is a fragmentary, exploded view of the coupling link structure taken along the line 2—2 of FIG. 1;

FIGURE 3 is an exploded end view taken along line 3—3 of FIG. 2;

FIGURE 4 is a cross sectional view taken along the line 4—4 of FIG. 1; and

FIGURE 5 is a perspective view of one of the coupler sections.

Referring now to the drawings, and to FIG. 1 in particular, there is shown a fragmentary portion of a typical chain constructed of forged, interconnected links 10. The two end links 10a and 10b of the chain are secured together by the coupling link structure 11 of this invention. It is to be understood that the new coupling link structure can be embodied to advantage in many other arrangements than that shown in FIG. 1, and that the illustrated chain has been chosen only for the purpose of describing a preferred construction and an exemplary manner of using the invention to those skilled in the art.

The coupling link structure 11 is generally comprised of a link 12 and a split coupler 13 which extends between and connects adjacent end portions of the link. In the illustrated form of the invention, the link 12 is a unitary, generally C-shaped member having T-shaped end portions 14 which extend toward and are spaced from each other. As best shown in FIGS. 2 and 3, the end portions 14 of the link 12 include shoulders 15, neck portions 16 extending from the shoulders and heads 17 at the ends of the neck portions.

According to the preferred embodiment of the invention, the split coupler 13 is formed by identical half sections 25. Each half section includes a base 26 and parallel side flanges 27 which mate with the flanges of the other half section to enclose the end portions 14 of the link 12. Lips 28 are formed at the ends of each section 25 of the coupler and project from the base 26 between the ends of the side flanges 27.

Each of the sections 25 of the split coupler 13 further includes a rib 29 which projects from the base 26 and extends parallel to the side flanges 27. The rib 29 of each half section is preferably located adjacent one of the side flanges 27 between its ends and is spaced from the other of the side flanges 27 by a distance at least equal to the thickness of the rib. Spaced holes 30 are formed through the ribs 29 in a direction transverse to the longitudinal axis of the split coupler 13, and cooperating grooves 31 are formed in the side flanges 27 in alignment with the holes 30.

In use the coupler sections 25 are mated together about the link end portions 14 so that the flanges 27 are in edge abutment and the ribs 29 are in side-by-side adjacency. As shown in FIG. 4, the rib 29 of each of the sections 25 projects into the space between the rib 29 of the other section and the side flange of that section which is spaced from the rib. The engagement of the rib 29 of each half section between the rib and the side flange of the other half section serves to prevent lateral movement of the coupler sections.

The T-shaped end portions 14 of the link 12 are received in opposite ends of the coupler 13 so that the heads 17 are between the lips 28 and the ends of the ribs 29. With this preferred construction the opposite end faces of the heads 17 are engageable by the lips 28 and by the ends of the ribs 29 to restrict longitudinal movement of the coupler 13 relative to the link 12, while the outer ends of the coupler are engaged between the shoulders 15 of the end portions 14 of the link. The cooperative formation of the coupler 13 and the end portions 14 of the link and the manner in which the end portions are locked within the coupler provides a strong structure capable of withstanding high tension loads.

As shown, the sections 25 of the split coupler 13 are secured together by pins 35. The pins 35 are received through the holes 30 of the ribs 29 and through the cooperating grooves 31 of the side flanges 27. The pins 35 are preferably formed of metal and are driven tightly into the holes 30 in order to prevent the pins from being inadvertently dislodged.

It will be apparent from the foregoing that the new coupling link structure is strong, compact and relatively simple in construction. The identical formation of the half sections of the coupler are such that the coupler can be inexpensively manufactured using a single set of forging dies. At the same time the new coupling link structure can be easily and quickly assembled in the field and affords unexpected strength. The new coupling link structure is reusable and can be disassembled simply by driving the pins 35 endwise from the holes 30.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:
1. Coupling link structure comprising in combination:
 (a) link means,
 (b) said link means having at least two spaced end portions,
 (c) a split coupler extending between and connecting said end portions together,
 (d) said split coupler being formed by half sections each including:
  (i) side portions which mate with the corresponding side portions of the other section to enclose said end portions of said link means,
  (ii) a rib between said end portions,
  (iii) said ribs of both sections being disposed in side-by-side adjacency,
 (e) and means extending through said ribs to secure said sections together.

2. A link structure as claimed in claim 1 wherein said link means is a unitary member having one pair of end portions.

3. A link structure as claimed in claim 1 wherein said sections of said split coupler are identical.

4. A link structure as claimed in claim 3 wherein said side portions extend the length of said coupler sections, and wherein said coupler has lips at its ends, said end portions of said link means being locked between said lips and said ribs.

5. A link structure as claimed in claim 3 wherein said ribs are parallel to said side portions, and wherein said securing means extends transversely to the longitudinal axis of said coupler.

6. Coupling link structure comprising in combination:
 (a) a generally C-shaped link,
 (b) said C-shaped link having:
  (i) shoulders adjacent the ends thereof,
  (ii) neck portions extending from said shoulders,
  (iii) and heads at the ends of said neck portions,
  (iv) said neck portions and heads defining generally T-shaped end portions which extend toward and are spaced from each other,
 (c) a split coupler extending between and connecting said T-shaped end portions to define an endless link structure,
 (d) said coupler being formed by identical half sections each including:
  (i) a base,
  (ii) parallel side flanges extending from the sides of said base,
  (iii) lips extending from the ends of said base between the ends of said side flanges,
  (iv) a rib projecting from said base adjacent one of said side flanges between its ends,
  (v) said rib being spaced from the other of said side flanges by a distance at least equal to the thickness of said rib,
 (e) said coupler sections being mated together with the edges of said side flanges in abutment and with said ribs in side-by-side adjacency so that the rib of one section projects into the space between the rib of the other section and said other side flange,
 (f) said T-shaped end portions being disposed in opposite ends of said coupler and said heads between said lips and the ends of said ribs,
 (g) and means securing said coupler sections together.

7. A coupling link structure as claimed in claim 6 wherein each of said ribs has at least one hole extending therethrough in alignment with the hole through the other rib; wherein said side flanges have cooperating grooves in alignment with said holes; and wherein said securing means extends through said cooperating grooves and holes.

8. A coupling link structure as claimed in claim 6 wherein opposite faces of said heads are engaged by said lips and the ends of said ribs to prevent longitudinal movement of said coupler relative to said link.

References Cited
UNITED STATES PATENTS

| | | | |
|---|---|---|---|
| 1,831,765 | 11/1931 | Gouverneur | 59—85 |
| 2,382,344 | 8/1945 | Pierre | 59—85 |
| 2,538,356 | 1/1951 | Donda | 59—85 |
| 3,246,464 | 4/1966 | Schommer | 59—85 |

CHARLES W. LANHAM, *Primary Examiner.*

C. P. CROSBY, *Assistant Examiner.*